US008552286B2

United States Patent
Mikhael et al.

(10) Patent No.: US 8,552,286 B2
(45) Date of Patent: Oct. 8, 2013

(54) METHOD OF ADAPTIVE SOLAR TRACKING USING VARIABLE STEP SIZE

(71) Applicant: University of Central Florida Research Foundation, Inc., Orlando, FL (US)

(72) Inventors: Wasfy Mikhael, Winter Springs, FL (US); Raghuram Ranganathan, Cookeville, TN (US); Nasser Kutkut, Orlando, FL (US); Issa Batarseh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 13/674,252

(22) Filed: Nov. 12, 2012

(65) Prior Publication Data

US 2013/0068283 A1   Mar. 21, 2013

Related U.S. Application Data

(62) Division of application No. 13/217,016, filed on Aug. 24, 2011, now Pat. No. 8,338,695.

(60) Provisional application No. 61/376,480, filed on Aug. 24, 2010.

(51) Int. Cl.
*G01J 1/20* (2006.01)
*G01C 21/02* (2006.01)
*G05B 13/02* (2006.01)

(52) U.S. Cl.
USPC ..... 136/246; 136/244; 250/201.1; 250/203.1; 250/203.4; 700/38

(58) Field of Classification Search
USPC ............ 136/244, 246; 700/38; 250/200–205
See application file for complete search history.

(56) References Cited

U.S. PATENT DOCUMENTS 5,919,314 A * 7/1999 Kim, II .................... 136/246
7,910,870 B2   3/2011 Yeh et al.

OTHER PUBLICATIONS

Abu-Qahouq, et al "Variable-Step-Size auto-tuning algorithm for digital power converter with variable-switching-frequency", IEEE, 2007, p. 105-111.*
Lee, et al, "Sun tracking systems: A review", Sensors, 9, 2009, p. 3875-3890.*
Raghuram Ranganathan, et al., "Adaptive sun tracking algorithm for incident energy maximization and efficiency improvement of PV panels" Elsevier, Renewable Energy 36 (2011), pp. 2623-2626, Elsevier Ltd.

* cited by examiner

*Primary Examiner* — Jennifer Michener
*Assistant Examiner* — Marla D McConnell
(74) *Attorney, Agent, or Firm* — Jetter & Associates, P.A.

(57) ABSTRACT

A method for controlling a photovoltaic (PV) panel in a PV system including a computing device that provides motor control signals and implements an iterative adaptive control (IAC) algorithm for adjusting an angle of the PV panel. The IAC algorithm relates P at a current time k (P(k)), an elevation angle of the PV panel at k ($\theta_S(k)$), P after a next step (P(k+1)) and an elevation angle of the PV panel at k+1 ($\theta_S(k+1)$). The algorithm generates a perturbed power value P(k+1) to provide a power perturbation to P(k), and calculates $\theta_S(k+1)$ using P(k+1). The motor control signals cause the motor to position the PV panel to achieve $\theta_S(k+1)$. A change in P resulting from the positioning is compared to a predetermined change limit, and only if the change in P is ≥ the change limit, again sensing P, and repeating the generating, calculating and positioning.

8 Claims, 4 Drawing Sheets

TRACKING ERROR VS. SOLAR ELEVATION ANGLE

METHOD OF ADAPTIVE SOLAR TRACKING USING VARIABLE STEP SIZE

CROSS REFERENCE TO RELATED APPLICATIONS

This application claims is a divisional application of U.S. Non-Provisional patent application Ser. No. 13/217,016 entitled "ITERATIVE ADAPTIVE SOLAR TRACKING HAVING VARIABLE STEP SIZE", filed on Aug. 24, 2011, which is now U.S. Pat. No. 8,338,695, which claims the benefit of U.S. Provisional Patent Application No. 61/376,480 entitled "ITERATIVE ADAPTIVE SOLAR TRACKING HAVING VARIABLE STEP SIZE", filed on Aug. 24, 2010, both of which are incorporated by reference in their entirety into this application.

TECHNICAL FIELD

Disclosed embodiments relate to photovoltaics, and more specifically to photovoltaic systems having iterative solar tracking.

BACKGROUND

In solar technology, the photovoltaic (PV) panel orientation relative to the sun's rays determines power production. On a clear day, power is maximized when the solar panel is oriented normal to the direction sun's rays. During days with dubious weather, the actual maximum point of power production may not be exclusively based on the position of the sun due to atmospheric scattering. Also, because the sun's position in the sky moves throughout the day, the elevation angle for a solar panel needs to be changed several times each hour (e.g., every minute) to provide maximum output power. Over longer periods of time, the azimuth position for maximum power output changes as well, requiring the azimuthal angle of the solar panel to also be changed.

Sun tracking allows a PV panel to follow motion of the sun to help maximize power. Sun tracking and can be performed manually, or automatically. Conventional automation requires sensors to determine the location of the sun, or to have a pre-programmed tracking path to predict the position of the sun to obtain in an attempt to obtain maximum power throughout the day. These systems can be expensive and inaccurate. There is thus a need to create a more efficient system and method for automatic solar tracking.

SUMMARY

Disclosed embodiments describe iterative adaptive solar tracking that uses a variable step size for adjusting the angle of photovoltaic (PV) panel(s) which may be contrasted with known iterative solar tracking that uses a constant step size for angular adjustments of the PV panel. A PV system including solar tracking comprises at least one PV panel for receiving radiation, a power sensor for detecting output power (P) from the PV panel, and a system controller comprising at least one computing device (e.g., microprocessor or microcontroller) that provides motor control signals and implements a disclosed iterative adaptive control (IAC) algorithm.

The IAC algorithm includes an iterative relation that increases the output power P from the PV panel by iteratively adjusting its elevation angle $\theta_S$, and optionally also the azimuthal angle $\theta_{AZ}$, to track the position of the sun. The output power P is used as the performance function in the IAC algorithm which is maximized using an adaptive gradient ascent approach.

The IAC algorithm is based on the Inventors recognizing that the output power P depends on the maximum direct-beam solar radiation intensity $H_n$ and the angle between the normal to the surface of the PV panel and the sun's rays $\theta_1$. Since $H_n$ varies with the time of day and year, and thus cannot be controlled, the IAC algorithm maximizes the output power P by minimizing $\theta_1$. The PV system perturbs the output power P, and the perturbed power value is used in the iterative relation to adaptively estimate the corresponding position angle $\theta_S$ (and optionally also $\theta_{AZ}$) for the PV panel(s) to achieve this perturbed power value. The resulting P is then measured. The iterative process can continue until there is no appreciable change in P.

Furthermore, at every iteration of the iterative relation, non-constant step sizes can be generated to update the position angles. This allows superior convergence properties for the IAC algorithm in terms of convergence speed, accuracy, and stability in contrast to known sun tracking methods that employ fixed step size angular position updates.

Also disclosed is a system controller for position controlling a PV panel in a PV system including a power sensor sensing output power (P), and a motor for positioning the PV panel. The system controller includes a computing device having memory that provides motor control signals and implements an IAC algorithm stored in the memory for adjusting an angle of the PV panel. The IAC algorithm includes an iterative relation that relates P at current time k (P(k)), its elevation angle at k ($\theta_S$ (k)), P after a next step (P(k+1)) and its elevation angle at k+1 ($\theta_S$ (k+1)). The IAC algorithm generates a perturbed power value P(k+1) to provide a power perturbation to P(k), and calculates a position angle $\theta_S$ (k+1) of the PV panel using the perturbed power value. The motor control signals from the computing device cause the motor to position the PV panel to achieve $\theta_S$ (k+1).

A method for controlling a PV panel in a PV system including a computing device that provides motor control signals and implements a disclosed IAC algorithm for adjusting the angle of the PV panel. The IAC algorithm relates P at a current time k (P(k)), an elevation angle of the PV panel at k ($\theta_S$ (k)), P after a next step (P(k+1)) and an elevation angle of the PV panel at k+1 ($\theta_S$ (k+1)). The algorithm generates a perturbed power value P(k+1) to provide a power perturbation to P(k), and calculates $\theta_S$ (k+1) using P(k+1). The motor control signals cause the motor to position the PV panel to achieve $\theta_S$ (k+1). A change in P resulting from the positioning is compared to a change limit, and only if the change in P is ≥ the change limit, again sensing p and then again generating, calculating and positioning.

DETAILED DESCRIPTION

Figure 1:
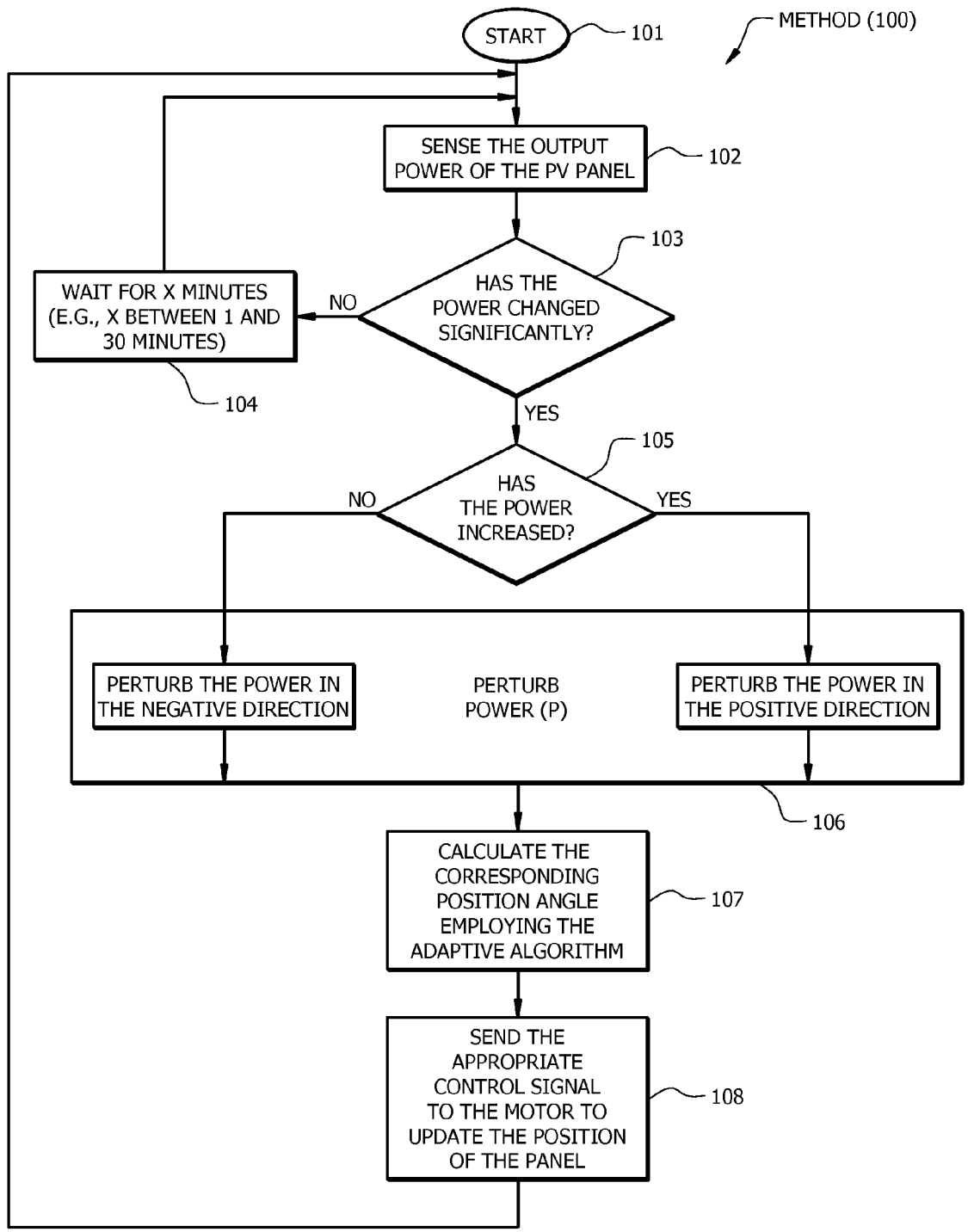
FIG. 1 is a flow chart showing steps in an exemplary method of automatic solar tracking using a variable step size for adjusting the angle of a PV panel, according to a disclosed embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is a flow chart showing steps in an example method 100 of automatic solar tracking using a variable step size for adjusting the angle of at least one PV panel, according to a disclosed embodiment. Step 101 shown as start comprises providing at least one PV panel having a panel surface for receiving solar radiation, a power sensor coupled to an output of the PV panel for sensing an output power (P) provided by the PV panel, and a system controller. The system controller includes at least one computing device (e.g., microprocessor) having an associated memory that provides motor control signals and implements an IAC algorithm stored in the memory for adjusting the angle of the PV panel. The IAC algorithm includes an iterative relation that relates the P at a current time k (P(k)), its elevation angle at k ($\theta_S(k)$), P after a next step (P(k+1)) and its elevation angle at time k+1 ($\Theta_S(k+1)$). The IAC algorithm can also adjust $\theta_{AZ}$.

Step 102 comprises sensing the power output of the PV panel. Step 103 comprises calculating a change in P and determining whether P changed significantly (e.g., relative to a predetermined P change limit). Step 104 comprises waiting a predetermined waiting period (e.g., 1 to 30 minutes as shown in FIG. 1) before returning to step 102 for another power sensor reading. Accordingly, at any point in the day, the method will wait for the predetermined waiting period between power sensor readings, and if there is no significant change in power (step 103), the method will continue to wait another predetermined waiting period (e.g., 1 to 30 minutes). The predetermined waiting period will not measurably affect the performance of the system controlled by method 100 as the earth moves slowly around the sun.

During startup, the registers or other memory device associated with the power sensor that stores sensed P values for step 102 are generally initialized to 0. Hence, at startup there will be no change in P at step 103 and step 104 will redirect the method 100 at startup after the predetermined waiting period (e.g., 1 to 30 minutes as shown in FIG. 1) for another P reading. As a result, there will not be an initial power perturbation (step 106, described below) at startup until the power sensor in step 102 senses a non zero value of P. During daylight the sensed P is always positive, and when the sensed P is determined to be appreciable (step 103), the method will find an increase in P (step 105) and the method will reach step 106 (power perturbation).

During operation of method 100 following startup, the change in P determined in step 103 will be the change in P resulting from the updated PV panel position resulting from the positioning step described below (step 108). As with startup, if the change in P is below a predetermined P change limit, step 104 is triggered which comprises waiting a predetermined waiting period then returning to step 102 for another power sensor reading. However, if the change in power at step 103 is at or above the pre-determined limit that defines an appreciable P change, step 105 is triggered which determines whether the P has increased or decreased to direct step 106 to perturb the power value for use in the iterative relation in the proper direction.

Step 106 comprises generating a perturbed power value P(k+1) to provide a power perturbation to the current P(k) for use in the iterative relation. The power can be perturbed in the positive or negative direction. Perturbing the power in the positive direction means increasing the power to be achieved, not the angle. As noted above, the angle is what is estimated by the IAC corresponding to the perturbed power. Likewise, perturbing power in the negative direction means decreasing the power to be achieved. If the output power P is increasing, the power perturbations continue to add a positive term to the current output power measurement (sensed at step 102), and if the output power P has decreased, it is known the movement should be in the opposite direction. Therefore, a term is subtracted from the current output power measurement to provide a reduced perturbed power value.

Once step 106 generates a perturbed power value to be achieved, the method moves to step 107 to find the corresponding position angle to achieve this perturbed power value. Step 107 comprises calculating a position angle $\theta_S$(k+1) using the value for perturbed power value in the iterative relation. As described below, the iterative relation uses a variable step size for adjusting $\theta_S$ that is based on both P(k+1) and P(k).

Step 108 comprises positioning the PV panel to achieve $\theta_S$(k+1). The positioning can comprise sending a suitable control signal to a stepper motor to update the position of the PV panel to achieve $\theta_S$(k+1). If the motor is a stepper motor, the control signal will be a pulse width modulation (PWM) signal. However, if a different type of motor is used, other signal modes can be used.

The method can optionally also apply a related IAC algorithm to also sun track the azimuthal position angle $\theta_{AZ}$ simultaneously with the elevation angle $\theta_S$. It is noted that $\theta_{AZ}$ is known to not measurably change unless the change is measured in weeks.

Figure 2:
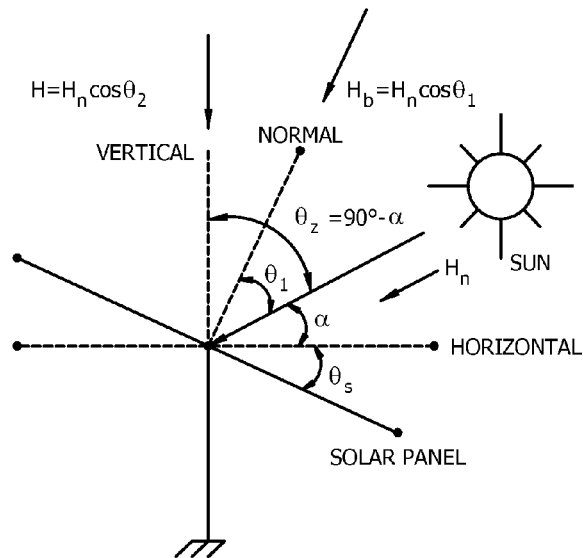
FIG. 2 is a diagram showing general geometric relationships between the sun and a planar PV panel.

FIG. 2 is a diagram showing general geometric relationships and relevant parameters between the sun and a planar PV panel for an embodiment that iteratively positions the $\theta_S$ for a solar panel, that is used in reference to the exemplary sun tracking algorithm described below. H is the power/area and $H_b$ is the incident direct beam (maximum; being normal to the surface of the PV panel) solar radiation.

Figure 3:
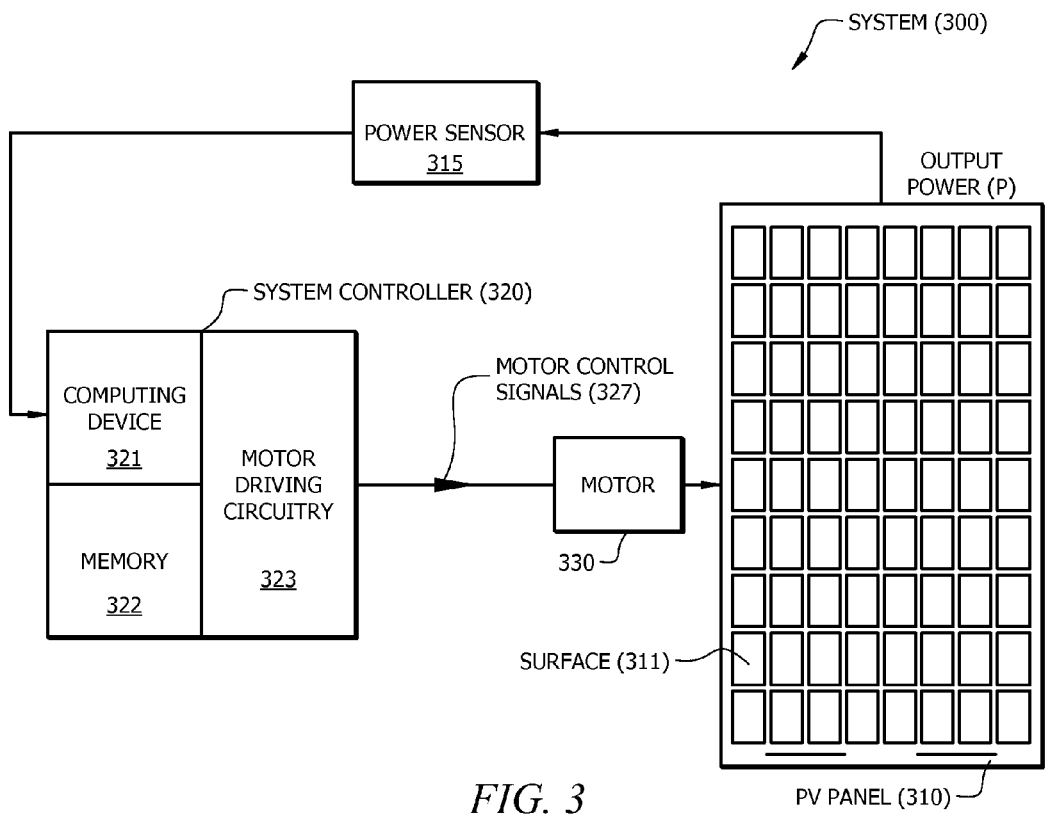
FIG. 3 is a block diagram representation of an example PV system including a disclosed system controller that implements a disclosed sun tracking algorithm, according to a disclosed embodiment.

FIG. 3 is a block diagram representation of an example PV system 300 having a system controller that implements a disclosed sun tracking algorithm, according to a disclosed embodiment. System 300 includes at least one PV panel 310 comprising an interconnected assembly photovoltaic cells having a panel surface 311 for receiving solar radiation and convert the solar radiation to electrical power. Because a single PV panel 310 can produce only a limited amount of power, in a typical application there will be several PV panels.

A power sensor 315 is coupled to an output of the PV panel 310 for sensing the output power (P) provided by the PV panel. System 300 includes a system controller 320 including at least one computing device 321 (e.g., processor) having associated memory 322 and motor driving circuitry 323 that provides motor control signals 327. System controller 320 implements an iterative adaptive control (IAC) algorithm that is stored in the memory 322 for adjusting an angle of the PV panel 310. The IAC algorithm includes an iterative relation that relates P at a current time k (P(k)), its elevation angle at k ($\theta$s (k)), P after a next step (P(k+1)) and its elevation angle at k+1 ($\theta$s (k+1)), wherein the IAC algorithm is operable to generate a perturbed power value P(k+1) to provide a power perturbation to P(k), and calculate a position angle (k+1) of the PV panel 310 using P(k+1) in the iterative relation.

The system 300 also includes a mechanical system comprising a motor (e.g., a DC motor) 330 coupled to receive the motor control signals 327 provided by motor driving circuitry 323. The motor control signals are configured for positioning the PV panel to achieve $\theta$s (k+1). Although shown in FIG. 3 controlling a single motor 330, motor driving circuitry 323 can control a plurality of motors to allow control of the angular position of a plurality of PV panels.

Mathematical Description of an Exemplary Algorithm

One approach for iteratively adjusting $\theta_S$ for solar panels is described below in equation form as follows. Firstly, the following parameters are defined-k: iteration index, $\mu(k)$: step size of position angle increment/decrement at k, $\alpha$: elevation angle of the sun which is an unknown.

The update equation for the position angle is given as:

$$\theta_S(k+1) = \theta_S(k) + \mu(k)\frac{\partial P(k)}{\partial \theta_S(k)} \tag{1}$$

The output power P of the PV panel is directly proportional to the incident direct beam solar radiation ($H_b$) given by the following relation:

$$P = H_b * A \tag{2}$$

where, A is the area of the PV panel.

Substituting (2) in (1), the following is obtained:

$$\theta_S(k+1) = \theta_S(k) + \mu(k)\frac{\partial H_b * A}{\partial \theta_S(k)} \tag{3}$$

$H_b$ can be expressed as $$H_b = H_n \cos(\theta_1) \tag{4}$$

where, $H_n$ is the maximum direct-beam solar radiation intensity, and $\theta_1$ is the angle between the normal to the PV panel surface and the sun's rays. As mentioned above, since no sensors are needed to measure the radiation received from the sun, $H_n$ is estimated adaptively. Hence, substituting (4) in (3), the following is obtained:

$$\theta_S(k+1) = \theta_S(k) + \mu(k)\frac{\partial H_n \cos(\theta_1) * A}{\partial \theta_S(k)} \tag{5}$$

However, from FIG. 2, it can be seen that at any point in time the following relation exists:

$$\theta_1 + \alpha + \theta_S = 90° \tag{6}$$

When the PV panel is tracking the sun, $\theta_1=0$, and correspondingly, $\alpha + \theta_S = 90°$.

Hence, substituting for $\theta_1$ in (5), the following is obtained:

$$\theta_S(k+1) = \theta_S(k) + \mu(k)\frac{\partial H_n \cos(90 - \{\alpha + \theta_S\}) * A}{\partial \theta_S(k)} \tag{7}$$

Combining $\theta_S$ and $\alpha$ into one angle $\theta_\gamma$, i.e. $\theta_S + \alpha = \theta_\gamma$, rewriting (1) as an optimization expression with respect to $\theta_\gamma$ as follows $$\theta_\gamma(k+1) = \theta_\gamma(k) + \mu(k)\frac{\partial P(k)}{\partial \theta_\gamma(k)} \tag{8}$$

Therefore, (8) can be rewritten as $$\theta_\gamma(k+1) = \theta_\gamma(k) + \mu(k)\frac{\partial H_n \sin(\theta_\gamma) * A}{\partial \theta_\gamma(k)} \tag{9}$$

Equations (10)-(13) described below provide a calculation of the step size. By evaluating (9) the following is obtained:

$$\theta_\gamma(k+1) = \theta_\gamma(k) + \mu(k)H_n \cos(\theta_\gamma) * A \tag{10}$$

Since the measured output power P is a function of $\theta_\gamma$, P can be expanded in an expansion, such as in a second order Taylor's series expansion with respect to $\theta_\gamma$ as follows:

$$P(k+1) = P(k) + \frac{\partial P(k)}{\partial \theta_\gamma(k)}\Delta\theta_\gamma(k) + \frac{1}{2!}\frac{\partial^2 P(k)}{\partial \theta_\gamma(k)^2}[\Delta\theta_\gamma(k)]^2 \tag{11}$$

It is possible to use a Taylor series of 3rd order, or higher than 3rd order. However, raising the order beyond 2nd order does not generally result in any appreciable increase in accuracy. In addition, it significantly increases the computational complexity of the algorithm. From (10), the following is obtained $$\Delta\theta_\gamma(k) = \mu(k)H_n \cos(\theta_\gamma) * A \tag{12}$$

Substituting (12) in (11), and performing the following derivative, $$\frac{\partial P(k+1)}{\partial \mu(k)} = 0 \qquad (13)$$

the following expression is obtained:

$$\theta_\gamma(k+1) = \theta_\gamma(k) - \cot(\theta_\gamma)/2 \qquad (14)$$

Rewriting (14) as follows:

$$\theta_\gamma(k+1) = \theta_\gamma(k) - \frac{H_n A * \cos(\theta_\gamma)}{2 * H_n A * \sin(\theta_\gamma)} \qquad (15)$$

From (2), (4), and (6), it is known that $$P = H_n A * \cos(\theta_1) = H_n A * \sin(\theta_\gamma) \qquad (16)$$

Therefore, $$H_n A * \cos(\theta_\gamma) = \sqrt{H_n^2 A^2 - P^2} \qquad (17)$$

Hence, substituting (16) and (17) in (15), the following is obtained:

$$\theta_\gamma(k+1) = \theta_\gamma(k) - \frac{H_n \sqrt{1 - \frac{P(k)^2}{A^2 H_n^2}}}{2 * P(k)/A} \qquad (18)$$

Simplifying (18), the following position angle update equation results $$\theta_\gamma(k+1) = \theta_\gamma(k) - \frac{\sqrt{A^2 H_n^2 - P(k)^2}}{2 * P(k)} \qquad (19)$$

Since the parameter being controlled is the position angle $\theta_S$ of the solar panel, (19) can be rewritten as:

$$\theta_S(k+1) = \theta_S(k) - \frac{\sqrt{A^2 H_n^2 - P(k)^2}}{2 * P(k)} \qquad (20)$$

The adaptive system may continue adjusting $\theta_S$ by the optimal amount represented by the ratio term in (20) at each iteration, until $\theta_S + \alpha = 90°$, and the panel is directly facing the sun and/or the maximum power position. Since (20) contains $H_n$ which is unknown, the output power $P(k)$ is perturbed to a new value $P(k+1)$ to provide a power perturbation to $P(k)$ and $\theta_S(k+1)$ is adaptively derived in each case, until the peak power $H_n * A$ is achieved. Hence, (20) can be rewritten as the following iterative relation:

$$\theta_S(k+1) = \theta_S(k) - \frac{\sqrt{P(k+1)^2 - P(k)^2}}{2 * P(k)} \qquad (21)$$

The output power $P(k)$ is perturbed as follows, $$P(k+1) = P(k) + [\text{sgn}(P(k) - P(k-1))] * (P(k) - P(k-1)) \qquad (22)$$

where, sgn is the signum function which as known in mathematics extracts the sign of a real number. Thus the step size for an increment or decrement of $\theta_S(k+1)$ is non-constant and generally changes with each step according to the above equations based on $P(k)$ and $P(k+1)$.

Depending on the season and time of the year, an analogous IAC algorithm based on the description above may be followed for adjusting $\theta_{AZ}$. However, as noted above, since $\theta_{AZ}$ generally changes much more gradually as compared to $\theta_S$, the adjustment to $\theta_{AZ}$ needed is substantially less frequently (e.g., weekly or monthly) as compared to $\theta_S$.

EXAMPLES

Disclosed embodiments of the invention are further illustrated by the following specific Examples, which should not be construed as limiting the scope or content of this Disclosure in any way.

Simulation results were generated using MATLAB software by varying the solar elevation angle from 0 to 180 degrees (sunrise to sunset), and calculating the tracking error and speed of convergence in each case, after a disclosed IAC algorithm converges. For each elevation angle $\alpha$, the corresponding direct beam intensity $H_n$ in (4) can be calculated according to the equation given by $$H_n = B * \exp[-C/\sin(\alpha)] \qquad (23)$$

where, B and C are site and climate related constants.

Initially, the PV panel was modeled as facing east during sunrise, i.e. $\alpha = 0$, and position angle $\theta_S = 90°$. As the day progressed, and $\alpha$ increased from 0 to 180°, the IAC algorithm automatically updated $\theta_S$ in optimal steps to align the sun's direct rays with the normal to the PV panel. Thus, the adaptive system was able to track changes in $\alpha$, and correspondingly $H_n$, without any prior knowledge or measurement of these parameters. In this manner, peak power $H_n * A$ was produced by the panel throughput the day.

Figure 4:
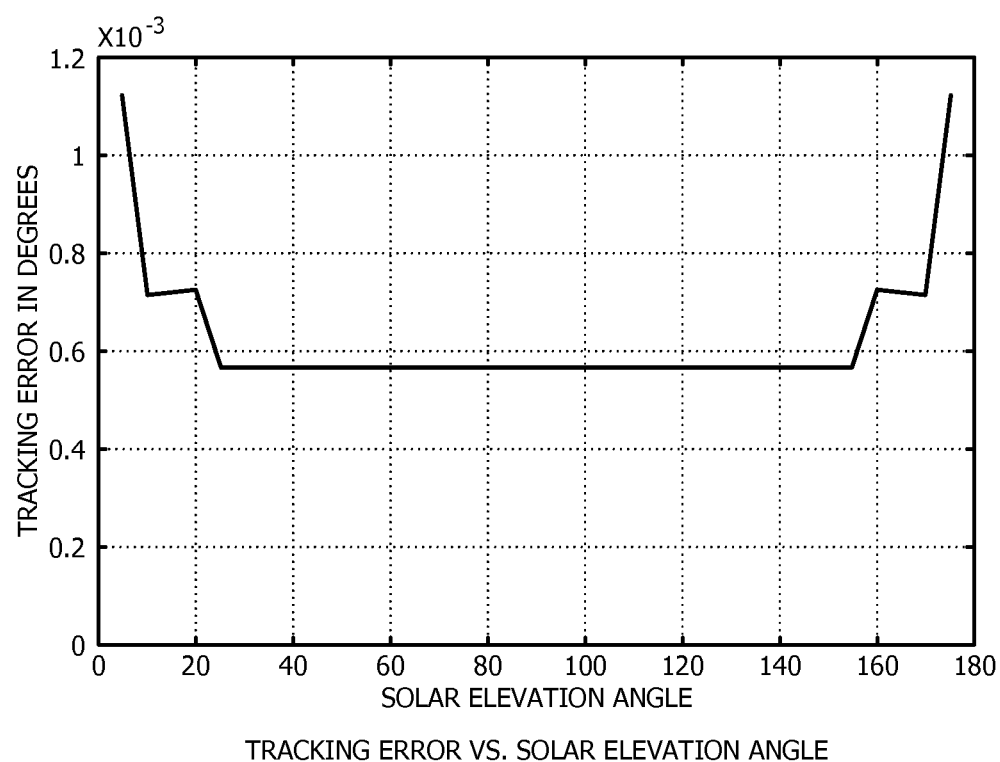
FIG. 4 is simulation data showing tracking error vs. solar elevation angle, according to a disclosed embodiment.
Figure 5:
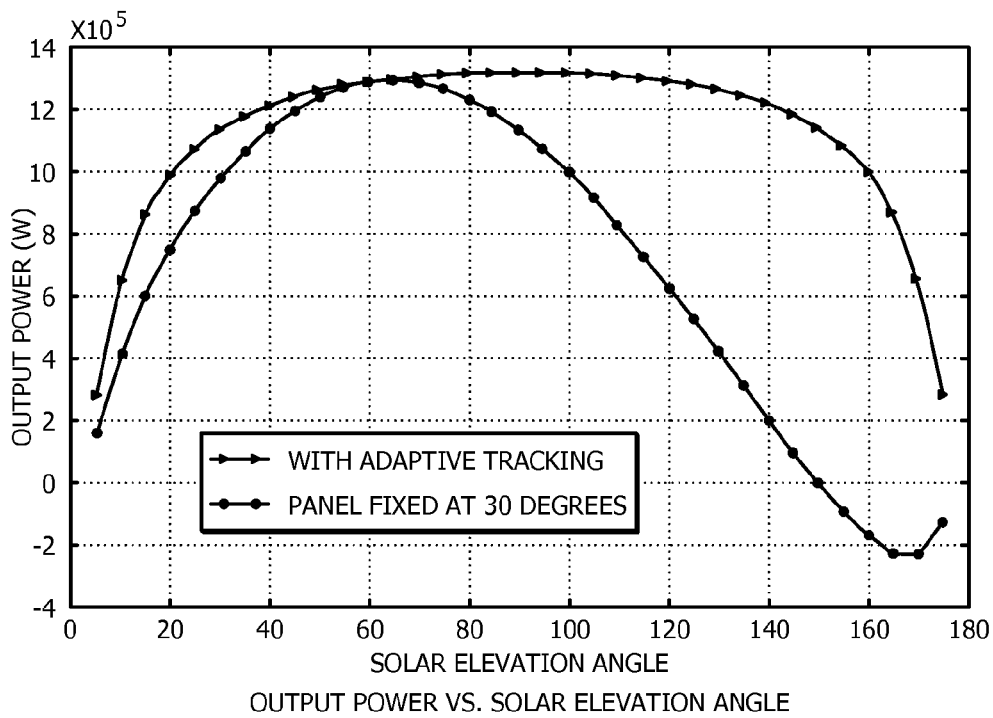
FIG. 5 is simulation data showing output power vs. solar elevation angle, according to a disclosed embodiment.
Figure 6:
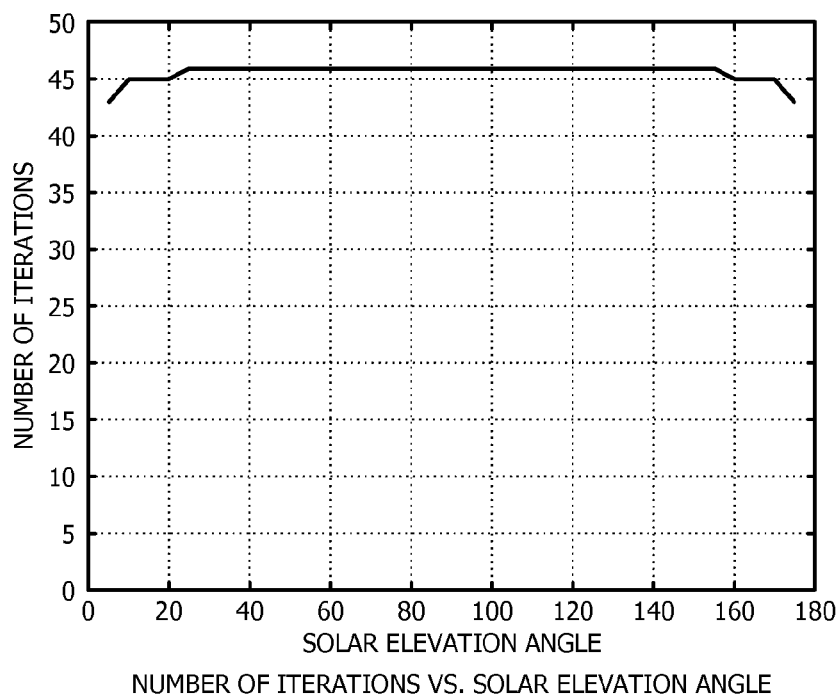
FIG. 6 is simulation data showing the number of iterations vs. solar elevation angle, according to a disclosed embodiment.

The resulting tracking error vs. the solar elevation angle is plotted in FIG. 4. The corresponding output power achieved by the IAC algorithm, in comparison to a PV panel fixed at 30° position angle is shown in FIG. 5. The convergence speed, in terms of number of iterations required to converge in each case, is illustrated in FIG. 6.

From the simulation results, it is evident that the IAC algorithm yields excellent tracking accuracy of the order of $10^{-3}$, with a significant increase in power output as compared to a fixed PV panel. Furthermore, the IAC algorithm consistently converges in less than 50 iterations, demonstrating fast adaptation to the changes in the elevation angle of the sun.

Although specific embodiments have been illustrated and described herein, it will be appreciated by those of ordinary skill in the art that any arrangement which is calculated to achieve the same purpose may be substituted for the specific embodiments shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

The examples that are described in the above description provide sufficient detail to enable those skilled in the art to practice the subject matter, and serve to illustrate how the subject matter may be applied to various purposes or embodiments. References to "an", "a", "one", or "some" embodiments in this disclosure are not necessarily to the same embodiment, and such references may contemplate more than one embodiment. Other embodiments may be utilized, and structural, logical, and electrical changes may be made without departing from the scope of the present disclosure.

This disclosure is intended to cover any and all adaptations or variations of various embodiments. Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for automatic solar tracking for a photovoltaic (PV) system including at least one PV panel having a panel surface for receiving solar radiation, comprising:
   providing an iterative adaptive control (IAC) algorithm that includes an iterative relation that relates an output power (P) at a current time k (P(k)), an elevation angle of said PV panel at k ($\theta_S$ (k)), said P after a next step (P(k+1)) and an elevation angle of said PV panel at k+1 ($\theta_S$(k+1));
   generating, using at least one computing device, a perturbed output power value P(k+1) to provide a power perturbation to said P(k),
   calculating, by said computing device, said $\theta_S$(k+1) using said value for said P(k+1) in said iterative relation, and positioning said PV panel to achieve said $\theta_S$(k+1);
   sensing said P with said PV panel positioned at said $\theta_S$(k+1);
   wherein said IAC algorithm further implements:
      comparing a change in said P resulting from said positioning to a predetermined P change limit, and
      if said change in said P is ≥ said predetermined P change limit, repeating said sensing said P and said generating, calculating and said positioning, and
      if said change in said P < said predetermined P change limit, waiting a predetermined waiting period before repeating said sensing said P and said generating, calculating and said positioning.

2. The method of claim 1, wherein said iterative relation comprises:

$$\theta_S(k+1) = \theta_S(k) - \frac{\sqrt{P(k+1)^2 - P(k)^2}}{2*P(k)}.$$

3. The method of claim 1, wherein said P(k+1) is generated by the following equation:

$$P(k+1)=P(k)+[\text{sgn}(P(k)-P(k-1))]*(P(k)-P(k-1))$$

wherein said sgn is the signum function.

4. The method of claim 1, further comprising implementing an iterative adaptive control algorithm for iteratively adjusting an azimuthal angle $\theta_{AZ}$ of said PV panel.

5. The method of claim 1, wherein said method is exclusive of photosensors for sensing said solar radiation received by said PV panel.

6. The method of claim 1, wherein said predetermined waiting period is 1 to 30 minutes.

7. The method of claim 1, wherein a stepper motor is used for said positioning, said stepper motor controlled by a pulse width modulation (PWM) signal.

8. The method of claim 1, wherein said computing device comprises a microprocessor.

* * * * *